(12) United States Patent
Yao et al.

(10) Patent No.: US 10,204,455 B2
(45) Date of Patent: Feb. 12, 2019

(54) COLLISION PREVENTION FOR VIRTUAL REALITY SYSTEMS

(71) Applicant: Intel Corporation, Santa Clara, CA (US)

(72) Inventors: Zhen Yao, San Jose, CA (US); Suraj Sindia, Hillsboro, OR (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 14 days.

(21) Appl. No.: 15/396,463

(22) Filed: Dec. 31, 2016

(65) Prior Publication Data

US 2018/0190027 A1 Jul. 5, 2018

(51) Int. Cl.
*G06T 19/00* (2011.01)
*G06F 3/0346* (2013.01)
*G06F 3/01* (2006.01)

(52) U.S. Cl.
CPC ............ *G06T 19/006* (2013.01); *G06F 3/011* (2013.01); *G06F 3/0346* (2013.01); *G06T 2215/16* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/011; G06F 3/012; G06F 3/0304; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| 9,754,167 | B1* | 9/2017 | Holz | G06K 9/00671 |
| 2012/0194554 | A1 | 8/2012 | Kaino et al. | |
| 2014/0364212 | A1 | 12/2014 | Osman et al. | |
| 2015/0094142 | A1 | 4/2015 | Stafford | |
| 2015/0370318 | A1* | 12/2015 | Yamaguchi | G06F 3/005 345/157 |
| 2016/0124502 | A1* | 5/2016 | Sawyer | G02B 27/017 345/633 |
| 2016/0275873 | A1* | 9/2016 | Taylor | G06F 3/04842 |
| 2017/0205892 | A1* | 7/2017 | Petrovskaya | G06T 19/006 |
| 2017/0359650 | A1* | 12/2017 | Wexler | G06F 3/012 |

(Continued)

OTHER PUBLICATIONS

International Search Report dated Apr. 30, 2018, in International Application No. PCT/US2018/012007, filed Jan. 1, 2018, 5 pages.

*Primary Examiner* — Todd Buttram
(74) *Attorney, Agent, or Firm* — Thorpe North & Western, LLP; David W. Osborne

(57) ABSTRACT

Technology for virtual reality device for avoiding collisions during a virtual reality experience. The virtual reality device comprises an accelerometer configured to sense an acceleration of the virtual reality device and a gyroscope configured to sense an angular velocity and orientation of the virtual reality device. Further comprising one or more proximity sensors configured to detect an object. A processor may be configured to receive data from the one or more proximity sensors and predict a potential collision between a user of the virtual reality device and the object detected by the one or more proximity sensors. An alarm may generate an alert regarding the potential collision.

25 Claims, 8 Drawing Sheets

(56) References Cited

U.S. PATENT DOCUMENTS

2018/0012074 A1* 1/2018 Holz ................. G06T 7/248
2018/0046874 A1* 2/2018 Guo .................. G06K 9/3208
2018/0069932 A1* 3/2018 Tiwari ............... H04L 67/16

* cited by examiner

COLLISION PREVENTION FOR VIRTUAL REALITY SYSTEMS

BACKGROUND

The demand for virtual reality (VR) devices and systems has been increasing in recent years. VR is created by computer technologies that generate images, sounds and other sensations to create an environment. The environment may be three dimensional and immersive and may simulate a user's physical presence in the environment. A user may be able to interact with the space and objects in the environment using display screens or projectors and other devices. VR devices provide a unique user experience that may require a user to physically move in order to navigate or interact with the VR environment. Because a user is typically immersed in the VR environment, it may not be possible for the user to appreciate their actual location with respect to surrounding objects in a real-world environment in which the VR is being used.

BRIEF DESCRIPTION OF THE DRAWINGS

Features and advantages of invention embodiments will be apparent from the detailed description which follows, taken in conjunction with the accompanying drawings, which together illustrate, by way of example, features of the disclosure; and, wherein.

DESCRIPTION OF EMBODIMENTS

Figure 1:
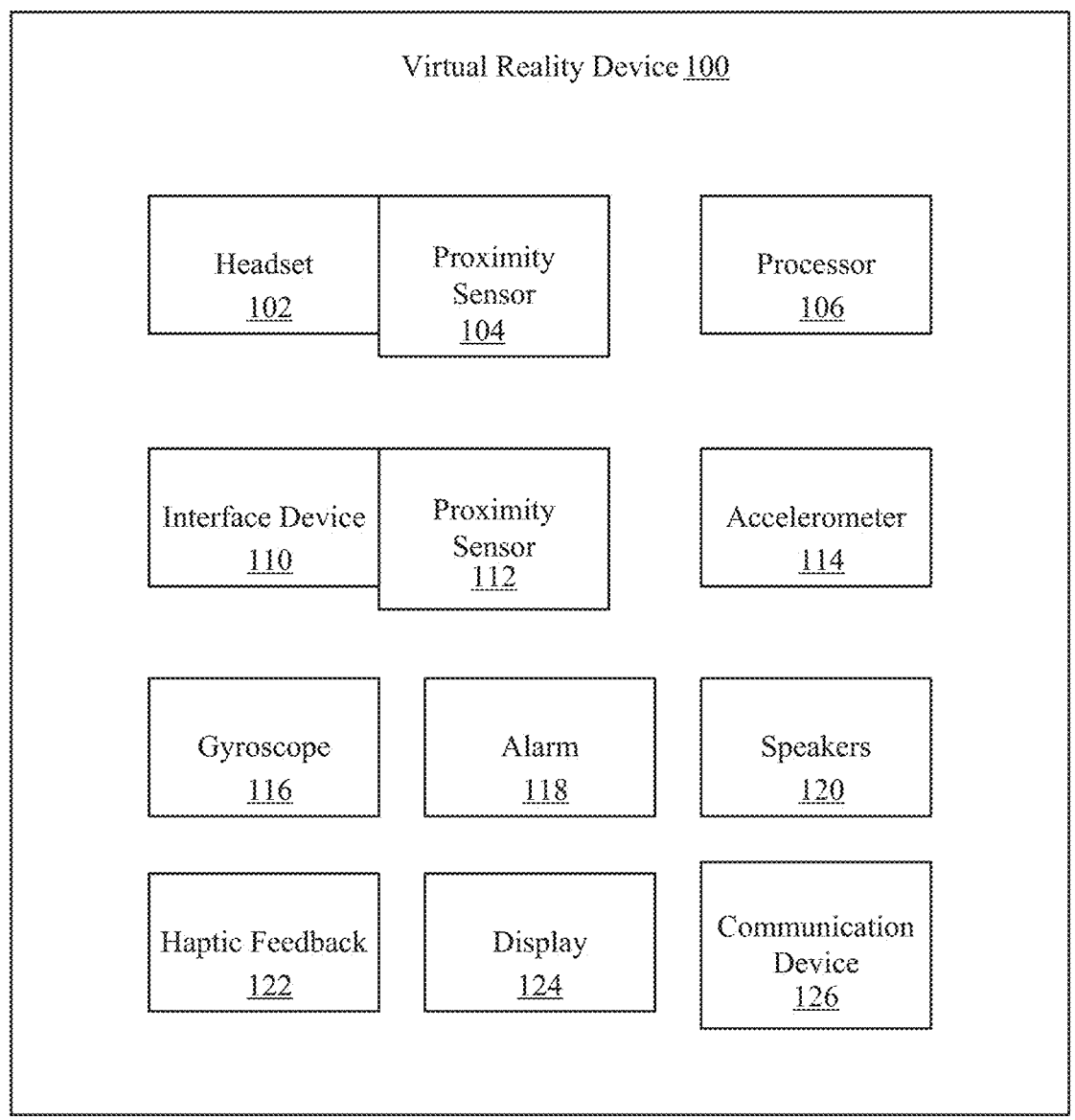
FIG. 1 is a block diagram of a virtual reality device in accordance with an example embodiment.

Before invention embodiments are described, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for describing particular examples or embodiments only and is not intended to be limiting. The same reference numerals in different drawings represent the same element. Numbers provided in flow charts and processes are provided for clarity in illustrating steps and operations and do not necessarily indicate a particular order or sequence.

Furthermore, the described features, structures, or characteristics can be combined in any suitable manner in one or more embodiments. In the following description, numerous specific details are provided, such as examples of layouts, distances, network examples, etc., to convey a thorough understanding of various invention embodiments. One skilled in the relevant art will recognize, however, that such detailed embodiments do not limit the overall inventive concepts articulated herein, but are merely representative thereof.

As used in this written description, the singular forms "a," "an" and "the" include express support for plural referents unless the context clearly dictates otherwise. Thus, for example, reference to "a proximity sensor" includes a plurality of such sensors.

Reference throughout this specification to "an example" means that a particular feature, structure, or characteristic described in connection with the example is included in at least one invention embodiment. Thus, appearances of the phrases "in an example" or "in an embodiment" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various invention embodiments and examples can be referred to herein along with alternatives for the various components thereof. It is understood that such embodiments, examples, and alternatives are not to be construed as de facto equivalents of one another, but are to be considered as separate and autonomous representations under the present disclosure.

Furthermore, the described features, structures, or characteristics can be combined in any suitable manner in one or more embodiments. In the following description, numerous specific details are provided, such as examples of layouts, distances, network examples, etc., to provide a thorough understanding of invention embodiments. One skilled in the relevant art will recognize, however, that the technology can be practiced without one or more of the specific details, or with other methods, components, layouts, etc. In other instances, well-known structures, materials, or operations may not be shown or described in detail to avoid obscuring aspects of the disclosure.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in this written description, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that any terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

As used herein, comparative terms such as "increased," "decreased," "better," "worse," "higher," "lower," "enhanced," and the like refer to a property of a device, component, or activity that is measurably different from other devices, components, or activities in a surrounding or adjacent area, in a single device or in multiple comparable devices, in a group or class, in multiple groups or classes, or as compared to the known state of the art. For example, VR device that employs technology that warns a user of proximity to objects in their physical surrounding may have "increased" safety, as compared to a VR system that does not employ such technology.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases, depend on the specific context. However, generally speaking, the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint. However, it is to be understood that even when the term "about" is used in the present specification in connection with a specific numerical value, that support for the exact numerical value recited apart from the "about" terminology is also provided.

Numerical amounts and data may be expressed or presented herein in a range format. It is to be understood, that such a range format is used merely for convenience and brevity, and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 1.5, 2, 2.3, 3, 3.8, 4, 4.6, 5, and 5.1 individually.

This same principle applies to ranges reciting only one numerical value as a minimum or a maximum. Furthermore, such an interpretation should apply regardless of the breadth of the range or the characteristics being described.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "processor" can include general purpose processors, specialized processors such as VLSI, FPGAs, or other types of specialized processors, as well as base band processors used in transceivers to send, receive, and process wireless communications.

It should be understood that many of the functional units described in this specification may have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

Example Embodiments

An initial overview of technology embodiments is provided below and then specific technology embodiments are described in further detail later. This initial summary is intended to aid readers in understanding the technology more quickly, but is not intended to identify key features or essential features of the technology nor is it intended to limit the scope of the claimed subject matter.

A user of a virtual reality (VR) device or system may participate in an immersive interactive experience such that the user's senses, such as vision and hearing, is occupied by the VR experience and the user may not perceive what is happening in the real world physical environment. This may lead to the user unintentionally colliding with objects in the physical environment surrounding the user. Exemplary objects may be, but are not limited to, furniture, walls, doors, people, pets, etc. To this end, various invention embodiments encompass a VR device that incorporates a sensing mechanism to prevent potential collisions. For example, one or more proximity sensors may be mounted or otherwise associated with a VR headset, controller, helmet, glove, or other wearable portion of the VR device or system. The proximity sensor is then able to detect objects in the physical setting surrounding the user of the VR device. Detection of an object is then used to determine a potential collision between the user of the VR device and the object, and an alert can be triggered or generated to alert the user to the potential collision so that the user may avoid the collision.

It should be appreciated that the collision prevention techniques of the technology using proximity sensors may be extended to other fields such as mixed reality.

FIG. 1 is a diagram illustrating an embodiment of a virtual reality device configured to predict a potential collision. The virtual reality device 100 may include wearable components or devices to interface with the user. The virtual reality device 100 can have any form that can be worn, held by, attached to, or otherwise share a spatial proximity or location with a user. Non-limiting examples of various form factors include eyeglasses, goggles, a headset, a helmet, a hand held game controller, a hand held game console, gloves, footwear, bracelets, wrist devices, a tablet computer, a smart phone or similar structure, an earpiece, a ring, etc. For example, the virtual reality device 100 may include more than one component such as a headset 102 as well as an interface device 110, which may be a wearable or hand held component. The virtual reality device 100 may include one or more output interfaces such as speakers 120 to output sound or audible signals, haptic feedback 122 to provide tactile output such as vibrations, and/or a display 124 to display visual information, graphics, or video. The virtual reality device 100 may include an accelerometer 114 to measure acceleration of the virtual reality device 100 or a component thereof. For example, each of the headset 102 and the interface device 110 may have an accelerometer. The virtual reality device 100 may also include a gyroscope 116 to determine an orientation of the virtual reality device 100 or a component thereof. For example, each of the headset 102 and the interface device may have a gyroscope.

The virtual reality device 100 may include a processor 106, which may be a central processing unit (CPU), an application-specific instruction set processor (ASIP), or other processor. The processor 106 may process data for the VR outputs and inputs as well as software associated with the virtual reality device 100. It should be appreciated that portions or components of the virtual reality device 100 may be permanently attached or mounted to one another or may be detachable or separate. The different components may communicate with one another over wired or wireless connections. For example, the interface device 110 may be a handheld controller that is connected to the processor 106 by a wireless connection. In one aspect, the headset 102 includes a detachable device such as a smart phone or tablet that includes the display 124 and the processor 106. The virtual reality device 100 may also include a communication device 126 to communicate with external devices such as local or remote computer systems, gaming consoles, other VR devices, etc. The communication device 126 may use wired or wireless connections and may communication via wireless protocols such as Wi-Fi or Bluetooth and may communicate over the internet.

In one aspect, the virtual reality device 100 may include one or more proximity sensors such a proximity sensor 104 and proximity sensor 112. A virtual reality device 100 may have several proximity sensors and may have the proximity sensors placed in various locations or on different components of the virtual reality device 100. For example, the headset 102 may have one or more proximity sensors such as proximity sensor 104 and the interface device 110 may have one or more proximity sensors such as the proximity sensor 112. The proximity sensor may be one of several different types of proximity sensors. A virtual reality device 100 may have more than one type or combinations of proximity sensors. The proximity sensors may be, but are not limited to, light detection and ranging (LIDAR) sensors, radio detection and ranging (RADAR) sensors, radio wave sensors, infrared (IR) sensors, capacitive sensors, inductive sensors, and ultrasound sensors.

In one aspect, the proximity sensor is capable of detecting or sensing an object 128 within a given range of the proximity sensor. The object 128 may be an object (e.g. a known object or an unknown or "foreign" object) within proximity to the user of the virtual reality device 100. For example, the object 128 may be furniture, a wall, a person, a pet, a door, etc. The user of the virtual reality device 100 may potentially collide with the object 128 and the potential collision may be difficult for the user to detect because the user's vision, hearing, and other senses may be occupied by the immersive experience provided by the virtual reality device 100. The proximity sensors may be ultrasonic sensors that propagate a sound through the air and receive or detect the sound reflected off a surface of the object. The amount of time between when the sound was sent and when the reflected sound is received can be used to determine the distance of object from the proximity sensor. The proximity sensors may also be able to detect relative velocities or accelerations for the object 128 compared to the proximity sensor. The data generated by the proximity sensors is sent to the processor 106, which uses the data to predict a potential collision between the user of the virtual reality device 100 and the object 128. In one aspect, the proximity sensors send raw data to the processor 106, which uses the data to determine the position, relative velocity, and/or relative acceleration of the object 128.

In one aspect, after the processor 106 predicts a potential collision, the processor 106 triggers a notification (e.g. an alarm) 118 to alert the user of the virtual reality device 100 regarding the potential collision. The virtual reality device 100 may have more than one notification or alarm. For example, alarm 118 may generate one or more types of alerts such as an audible alert via the speakers 120, a visual alert via the display 124, or a tactile alert via haptic feedback 122. The virtual reality device 100 may have more than one display, speaker, or haptic feedback for alerting the user to the potential collision. For example, the headset 102 may have the ability to provide haptic feedback by tapping the user on the forehead while the interface device 110 may be a wrist band that also has the ability to provide haptic feedback. The alarm 118 may alert the user with different alerts depending on different types or classes of potential collision. For example, if the potential collision with the object 128 is determined to have a high likelihood of success, then the alert may be different than a potential collision that has a low likelihood of success. In one aspect, a predicted potential collision may trigger an alert and after an interval of time, if the potential collision becomes more likely then the alert may become more persistent. For example, an initial alert may be a an audible chirp and if the potential collision becomes more likely than the chirp may repeat at a louder volume or may repeat several times at intervals closer in time. In a different aspect, as a potential collision becomes more likely an alert may change types such that an initial alert may be a haptic feedback while a subsequent alert may be a visual alert. Nearly any sequence or combination can be used. In one aspect, the alert may be more insistent or more invasive if the object has a relative velocity compared to the object that makes the potential collision likely as opposed to a potential collision where the object appears to be static and only the user is moving.

In one aspect, a velocity of the object may also be estimated by applying a certain chirp signal. The following is a description for velocity estimation. A generated chirp signal may be defined in equation (1):

$$x_1(t) = \sin(\alpha_1 e^t) \tag{1}$$

where t is time, and $\alpha_1$ is damping factor. Upon reflection of the signal from the obstacle, the reflected signal can be modeled by equation (2):

$$x_2(t) = \sin((\alpha_1 + \alpha_2 t)e^t) + n(t) \tag{2}$$

Where $\alpha_2$ is the changed damping factor, which is a function of the velocity of the approaching (or receding) obstacle, and n(t) is the ambient additive white Gaussian noise (AWGN) afflicting the transmitted and reflected signal. $\alpha_2$ is directly proportional to the velocity of the obstacle, whereas the time lapse between the generated signal and reflected signal (i.e. time-of-flight, $t_{tof}$) is proportional to the distance from the obstacle.

The following set of equations may be used to estimate the velocity of the approaching object. First derivative of $x_1(t)$ is given by equation (3):

$$x_1'(t) = \alpha_1 e^t \cos(\alpha_1 e^t) \tag{3}$$

First derivative of $x_2(t)$ is given by equation (4)

$$x_2'(t) = \cos((\alpha_1 + \alpha_2 t)e^t) \cdot (e^t(\alpha_1 + \alpha_2 t) + \alpha_2 e^t) + n'(t) \tag{4}$$

From the above expressions for $x_2'(t)$ and $x_1'(t)$, and under the assumption $\alpha_2 \ll \alpha_1$ it follows that equation (5):

$$x_2'(t) - x_1'(t) = \cos((\alpha_1 + \alpha_2 t)e^t) \cdot \alpha_2 e^t + \alpha_2 t \, e^t \cos(\alpha_1 e^t) + n'(t) \tag{5}$$

Ignoring the contribution of additive Gaussian noise n(t), equation (6) shows:

$$x_2'(t) - x_1'(t) = \cos((\alpha_1 + \alpha_2 t)e^t) \cdot \alpha_2 e^t + \alpha_2 t \, e^t \cos(\alpha_1 e^t) \tag{6}$$

Setting t=0 above gives equation (7):

$$x_2'(0) - x_1'(0) = \cos(\alpha_1) \cdot \alpha_2 \tag{7}$$

Or equation (8):

$$\alpha_2 = \frac{x_2'(0) - x_1'(0)}{\cos(\alpha_1)} \tag{8}$$

In this manner, $\alpha_2$ can be found to estimate the velocity of the approaching obstacle. Alternatively, if the time-of-flight $t_{tof}$ is known, then $\alpha_2$ can be estimated as follows. For example, if it is known that for any given t in equation (9):

$$x_2(t + t_{tof}) - x_1(t) \approx 0 \tag{9}$$

Or in equation (10):

$$x_2'(t + t_{tof}) - x_1'(t) \approx 0 \tag{10}$$

From equation (10) it follows that at t=0 for equation (11):

$$x_2'(t_{tof}) - x_1'(0) \approx 0 \tag{11}$$

From the equations (6) and (11), equation (12) follows:

$$\cos((\alpha_1 + \alpha_2 t_{tof})e^{t_{tof}}) \cdot \alpha_2 e^{t_{tof}} + \alpha_2 t_{tof} e^{t_{tof}} \cos(\alpha_1 e^{t_{tof}}) = 0 \tag{12}$$

Since $\alpha_1$ and $t_{tof}$ are known, the transcendental equation (12) can be solved numerically for $\alpha_2$. A numerical illustration of estimating $\alpha_2$ may be performed by generating a signal for duration of 10 s with parameters $\alpha_1 = 0.1$ and $\alpha_2 = 0.01$. By using equation (8) for $\alpha_2$, the value of $\alpha_2$ can be estimated to be 0.0101. That amounts to a 1% error in $\alpha_2$ estimation. In one aspect, when additive noise is added, then a suitable noise-deconvolution or low pass filtering may be performed on the received signal to remove the noise affects prior to using equation (8) to estimate $\alpha_2$.

Figure 2:
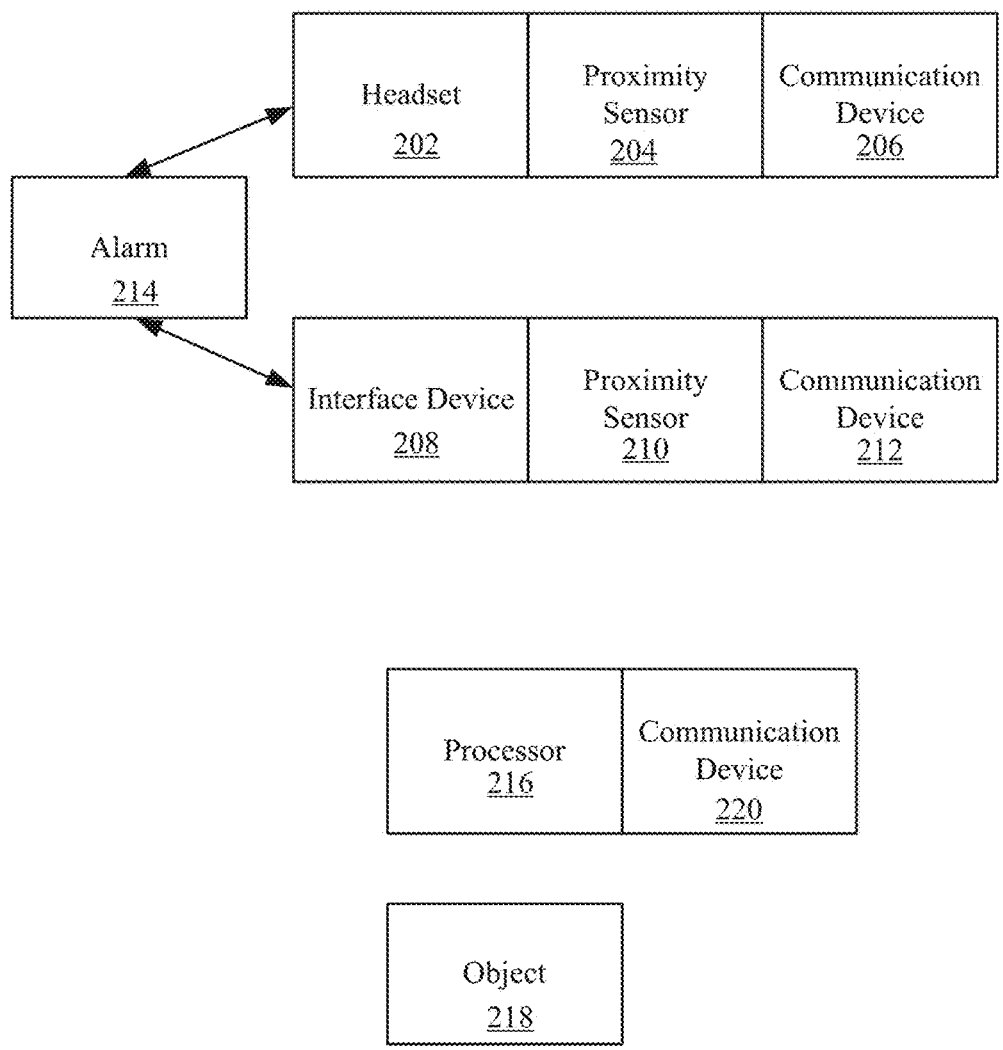
FIG. 2 is a block diagram of a virtual reality system in accordance with an example embodiment.

FIG. 2 is a diagram illustrating a virtual reality system configured to predict a potential collision. A virtual reality system 200 may include some features or capabilities of the virtual reality device 100 of FIG. 1. In one aspect, the virtual reality system 200 may be composed of distinct devices. For example, a headset 202, an interface device 208, and a processor 216 may be distinct devices from one another that communicate via a communication device 206 associated with the headset 202, a communication device 212 associated with the interface device 208, and a communication device 220 associated with the processor 216. The headset 202, the interface device 208, and the processor 216 may communicate with one another over wired or wireless channels. The processor 216 may be located physically proximate or remote to the headset 202 and the interface device 208. The headset 202 may be coupled to or otherwise associated with a proximity sensor 204 and the interface device 208 may be coupled to or otherwise associated with a proximity sensor 210. The proximity sensor 204 and the proximity sensor 210 may be used to detect an object 218, which is an object in proximity to the virtual reality system 200.

Figure 3:
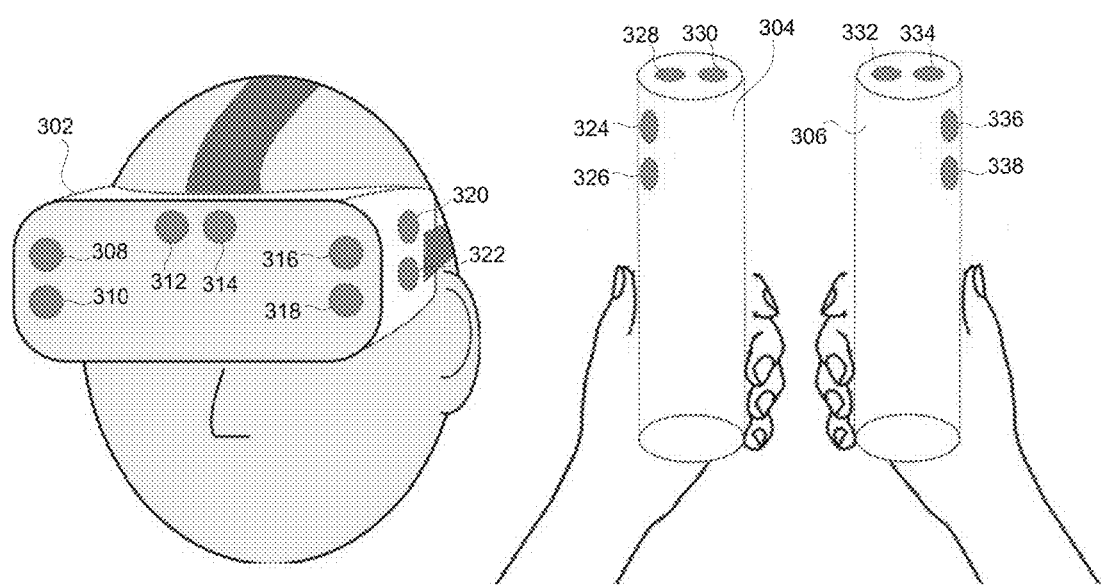
FIG. 3 is a block diagram of components of a virtual reality device in accordance with an example embodiment.

FIG. 3 is a diagram of components of a virtual reality device configured to predict a potential collision. FIG. 3 depicts a headset 302, which may have some or all of the features and capabilities of the headset 102 of FIG. 1 or as elsewhere described herein. FIG. 3 also depicts hand controller 304 and hand controller 306, which may have some or all of the capabilities and features of interface device 110 of FIG. 1 or as elsewhere described herein. The headset 302 is depicted as including proximity sensors 308, 310, 312, 314, 316, 318, 320, and 322. The hand controller 304 is depicted as including proximity sensors 324, 326, 328, and 330. The hand controller 306 is depicted as including proximity sensors 332, 334, 336, and 338. It should be appreciated that that the headset 302, the hand controller 304, and the hand controller 306 may comprise any number of proximity sensors. For example, the headset 302 may include 2, 4, 6, or 8 proximity sensors. In one aspect, the headset 302, the hand controller 304, or the hand controller 306 may have more than one proximity sensors where the proximity sensors each have a direction or field of view and the proximity sensors are mounted on different surfaces of the headset 302, the hand controller 304, or the hand controller 306 such that the proximity sensors face different directions. For example, the headset 302 may have proximity sensors 308, 310, 312, 314, 316, and 318 that face forward and the proximity sensors 320 and 322 face to one side of the headset 302 while other proximity sensors not depicted may face an even different direction. In one aspect, the proximity sensors 328, 330, 332, and 334 face a top direction of the hand controller 304 and the hand controller 306 while the proximity sensors 324, 326, 336, and 338 face a side direction.

Figure 4:
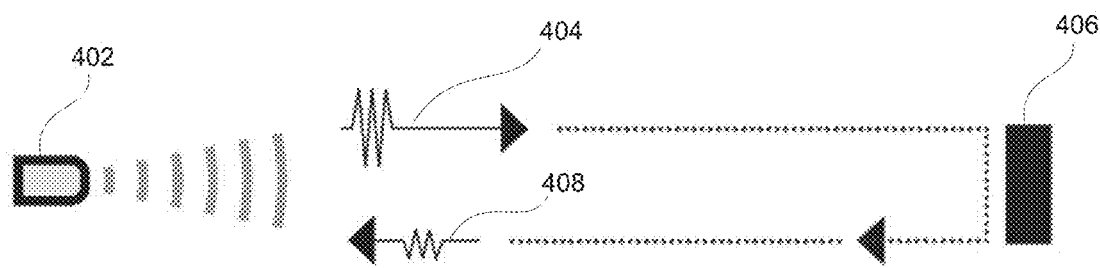
FIG. 4 is a block diagram illustrating a proximity sensor detecting an object in accordance with another example embodiment.

FIG. 4 is a diagram illustrating a proximity sensor detecting an object. FIG. 4 depicts a proximity sensor 408, which is a proximity sensor capable of propagating or generating a transmission 404 such as a transmission wave. The transmission 404 may be a sound, an electromagnetic radiation, light, or other transmission. The transmission 404 may impinge on a surface of an object 406, which is a physical object that may be the same as object 102 of FIG. 1. The transmission 404 may be reflected off the object 406 as an echo 408. The echo 408 may be transmitted back to the proximity sensor 408 where it is received. The proximity sensor 408 may employ light detection and ranging (LIDAR), radio detection and ranging (RADAR), radio waves, infrared (IR), capacitive sensors, inductive sensors, and ultrasound. In one aspect, the proximity sensor 408 employs ultrasound where the transmission 404 transmits a sound at time t1, and the sound will be propagating through the air and reflected back by the object 406 and picked up by the receiver of the proximity sensor 408 at time t2, so the distance between the proximity sensor 408 and the object 406 is found using equation (13):

$$D = \text{sound speed} * (t2 - t1)/2 \qquad (13)$$

In one aspect, a controller or microcontroller is employed to trigger the proximity sensor 408 to send out the transmission 404. In one aspect, the proximity sensor 408 send out an eight cycle burst of ultrasound at 40 kilohertz. In one aspect, the range of error for distance detection of the distance between the proximity sensor 408 and the object 406 is less than five percent. In one aspect, the proximity sensor 408 can detect distances of the object 406 with a range of two centimeters to several meters. This range may encompass the size of an average living room or other space where a virtual reality device is employed by a user.

Figure 5:
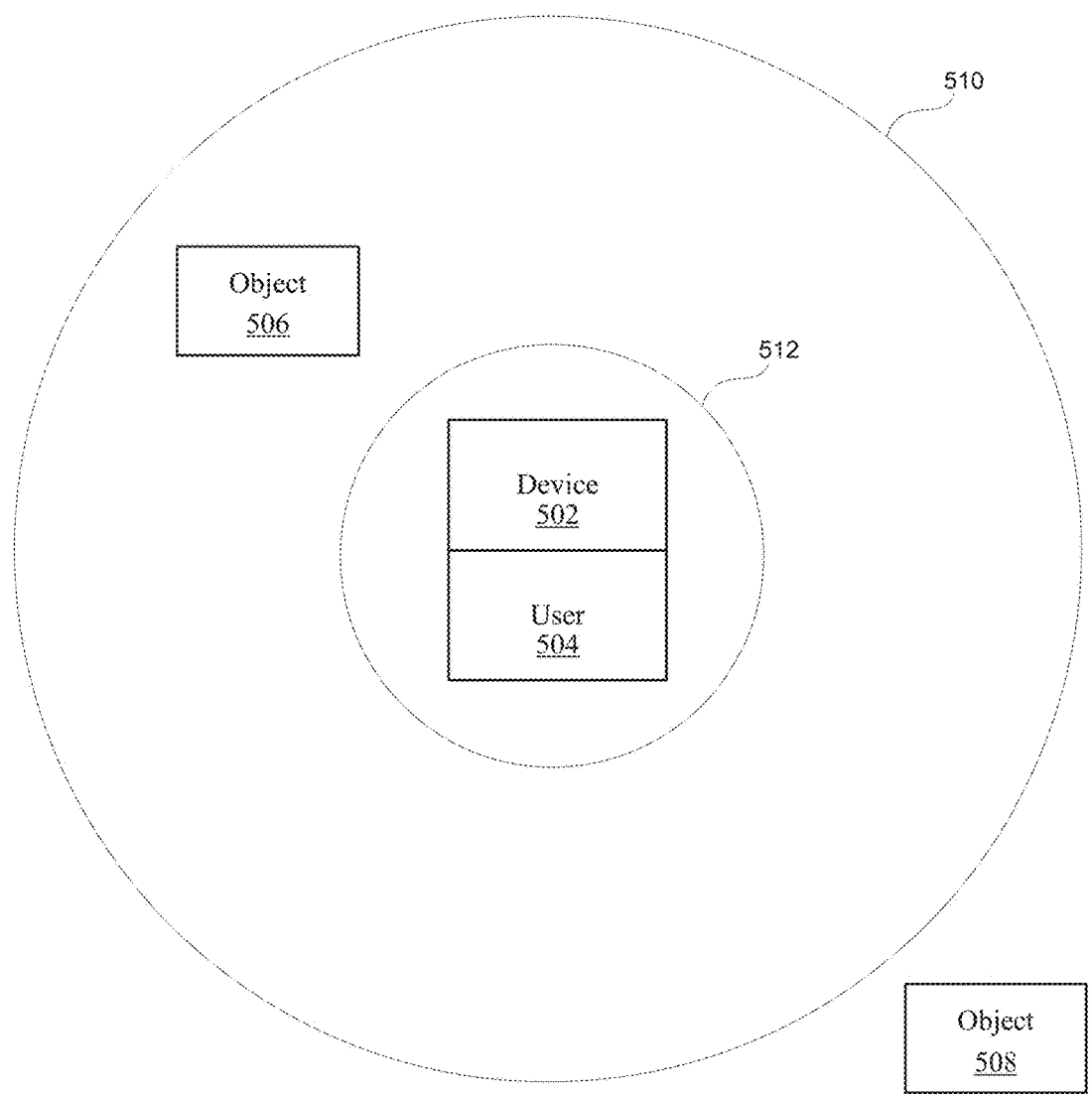
FIG. 5 is a block diagram illustrating predetermined thresholds for predicting collisions in accordance with another example embodiment.

FIG. 5 is a diagram illustrating predetermined thresholds for predicting collisions. FIG. 5 depicts a device 502, which may be a virtual reality device such as the virtual reality device 100 of FIG. 1, or as otherwise described herein. The device 502 may be associated with or used by a user 504. In one aspect, a threshold 512 surrounds the device 502 and/or the user 504. The threshold 512 may be a predefined distance such as a radius, a sphere, or a half sphere that surrounds the device 502 and/or the user 504. The threshold 512 may be defined to be the same size as the reach of body parts of the average size user of the virtual reality device or slightly larger. For example, the typical human arm length may be 25 inches (~64 cm), so that the threshold 512 may be defined as 70 cm. The processor of the device 502 may be configured such that predicted potential collisions within the threshold 512 will not trigger an alert based on the potential collision. This may be done so that a body part of the user will not trigger a potential collision alert. In one aspect, the device 502 may prompt the user for measurements of body parts such as arm length. This actual measurement may then be used to determine the distances for the threshold 512 for the particular user.

In one aspect, an outer threshold 510 may also be defined. The technology may employ both the threshold 512 and the outer threshold 510 or may use one without the other. The outer threshold 510 may be parallel is shape to the threshold 512 only larger. Objects detected outside of the outer threshold 510 may not trigger an alert for a potential collision because the likelihood of actual collision may be trivial. The size of the outer threshold 510 may be determined based on historical data a virtual reality device being used. The outer threshold 510 may change based on the software or game being used in conjunction with the virtual reality device. The outer threshold 510 may be user defined. In one aspect, the object 506 may be detected within the outer threshold 510 and will thus trigger an alert if a potential collision is detected, whereas the object 508 may be detected outside of the outer threshold 510 and may not trigger an alert even if a potential collision is detected.

In one aspect, the technology operates with the proximity sensors of the device 502 to prevent the device 502 from triggering a false alert when the device 502 senses or detects the ground or floor as an object. For example, a gyroscope such as gyroscope 116 of FIG. 1 may determine an orientation of the device 502. The device 502 may have more than one component such as a headset or a hand controller. Each of the components may have one or more gyroscopes used to determine orientation of each of the components. Before a user operates the device 502 for use in activities such as gaming, the device 502 may be calibrated by prompting the user for information regarding the user's height. The distance from the ground to each component of the device 502 may be estimated taking into account the user's height and the orientation determination made by the gyroscope. In the methods of the present technology, the distance from the ground to each component of the device 502 may change dynamically during operation of the device 502. The method may dynamically calculate the distance from the ground to each component of the device 502 during operation of the device 502 in real-time. The dynamically changing distance may then be set as a threshold such that when the floor is detected by the proximity sensor, the floor is ignored as a potential collision with the user. This threshold may operate similar to outer threshold 510.

Figure 6:
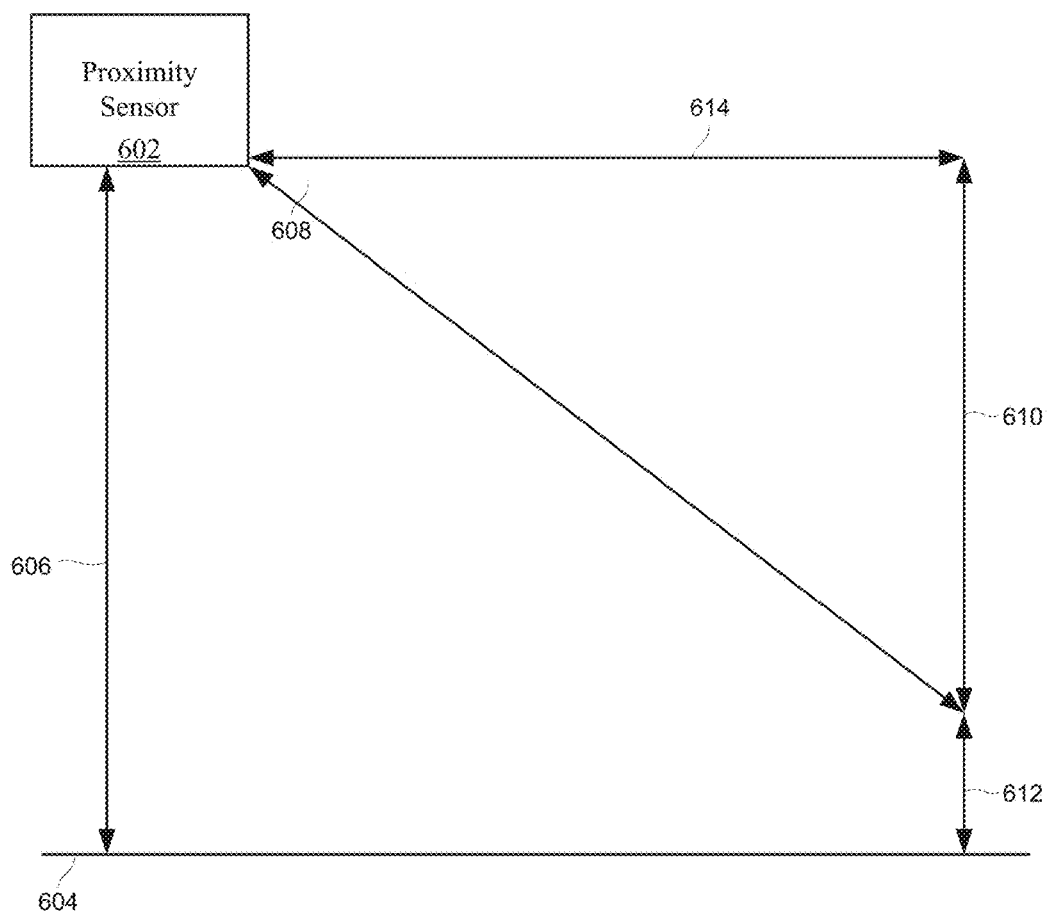
FIG. 6 is a block diagram illustrating a field of view for a proximity sensor in accordance with another example embodiment.

FIG. 6 is a diagram illustrating a field of view for a proximity sensor. A proximity sensor may have a field of view or angle-of-view (AOV) that limits what objects the proximity sensors can detect. The field of view may be directional such that a proximity sensor may not be able to detect objects in a 360 degree field of view. For example a field of view for a proximity sensor may be 30 degrees. This limitation may be overcome by employing more than one proximity sensors to ensure that a full field of view is employed by the technology to detect all potential collisions. The environment 600 depicts proximity sensor 602 held a height 606 above the ground 604. The proximity sensor 604 may be held above the ground because the user is standing while holding the headset or interface device that the proximity sensor 602 is mounted on. For example, the lateral distance 614 depicts the outer range or distance for an object that the proximity sensor 602 can detect. For a nominal person of height 5 feet, 7 inches, i.e. 5.58 feet, a field of view 610 with an angle 608 of 30 degrees makes it possible to detect obstacles of height 612 of 0.96 feet or higher (from the ground 604) at a lateral distance 614 of eight feet or farther as shown.

Figure 7:
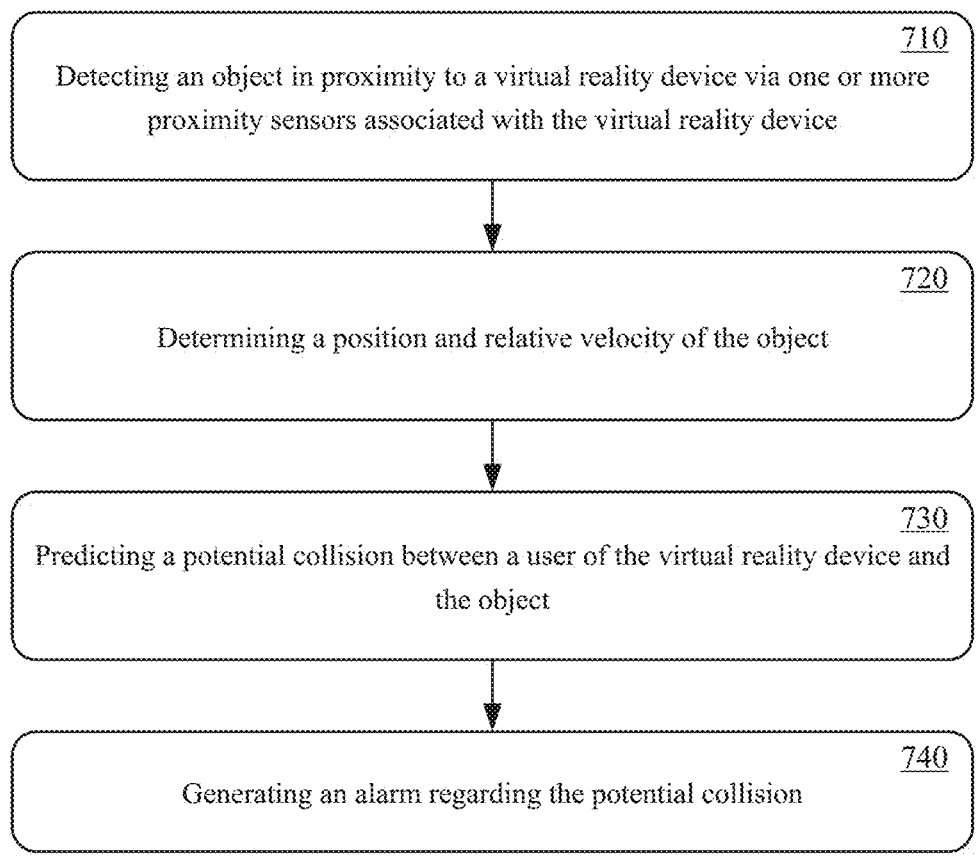
FIG. 7 is a flow diagram of a method for avoiding collisions during a virtual reality experience in accordance with an example embodiment.

FIG. 7 depicts a flowchart of process 700 of a method for avoiding collisions during a virtual reality experience. The method can be executed as instructions on a machine, where the instructions are included on at least one computer readable medium or one non-transitory machine-readable storage medium. In one embodiment, the virtual reality device 100 of FIG. 1 or the virtual reality system 200 of FIG. 2, or any other device or system recited herein, is configured to carry out the steps process 700. Moreover, the devices and components depicted in FIGS. 1-2 may be employed to carry out the steps of process 700. The method can include the operation of: detecting an object in proximity to a virtual reality device via one or more proximity sensors associated with the virtual reality device, as in block 710. The method can include the operation of: determining a position and relative velocity of the object, as in block 720. The method can include the operation of: predicting a potential collision between a user of the virtual reality device and the object, as in block 730. The method can include the operation of: generating an alarm regarding the potential collision, as in block 740. It should be appreciated that the steps of process 700 may not include all of the steps depicted nor in the order in which they are depicted.

Figure 8:
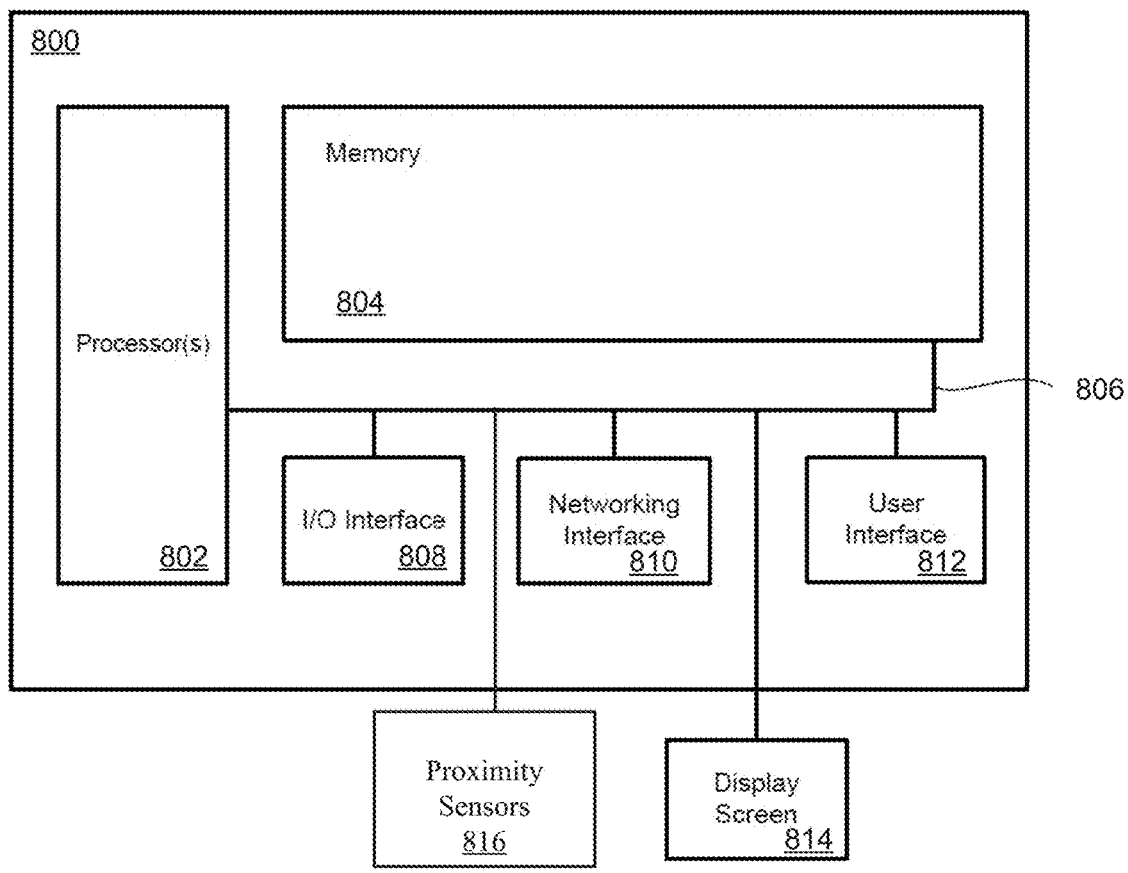
FIG. 8 is a block diagram of an example computer system with a proximity sensor in accordance with another example embodiment.

FIG. 8 depicts an exemplary system upon which embodiments of the present disclosure may be implemented. For example, the system of FIG. 8 may be a computer system or virtual reality device. The system can include a memory controller 802, a plurality of memory 804, a processor 806, and circuitry 808. The circuitry can be configured to implement the hardware described herein for virtual reality device 100 of FIG. 1 or as otherwise recited herein. Various embodiments of such systems for FIG. 8 can include smart phones, laptop computers, handheld and tablet devices, CPU systems, SoC systems, server systems, networking systems, storage systems, high capacity memory systems, or any other computational system.

The system can also include an I/O (input/output) interface 810 for controlling the I/O functions of the system, as well as for I/O connectivity to devices outside of the system. A network interface can also be included for network connectivity, either as a separate interface or as part of the I/O interface 810. The network interface can control network communications both within the system and outside of the system. The network interface can include a wired interface, a wireless interface, a Bluetooth interface, optical interface, and the like, including appropriate combinations thereof. Furthermore, the system can additionally include various user interfaces, display devices, as well as various other components that would be beneficial for such a system.

The system can also include memory in addition to memory 804 that can include any device, combination of devices, circuitry, and the like that is capable of storing, accessing, organizing and/or retrieving data. Non-limiting examples include SANs (Storage Area Network), cloud storage networks, volatile or non-volatile RAM, phase change memory, optical media, hard-drive type media, and the like, including combinations thereof.

The processor 806 can be a single or multiple processors, and the memory can be a single or multiple memories. The local communication interface can be used as a pathway to facilitate communication between any of a single processor, multiple processors, a single memory, multiple memories, the various interfaces, and the like, in any useful combination.

The system can also include a user interface 812 a graphical user interface for interacting with the user. The system can also include a display screen 814 for displaying images and the user interface 812. The system can also include proximity sensors 816 for detecting objects.

The disclosed embodiments may be implemented, in some cases, in hardware, firmware, software, or any combination thereof. Portions of the disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

EXAMPLES

The following examples pertain to specific technology embodiments and point out specific features, elements, or steps that may be used or otherwise combined in achieving such embodiments.

In one example there is provided, virtual reality device, including an accelerometer configured to sense an acceleration of the virtual reality device;

a gyroscope configured to sense an angular velocity and orientation of the virtual reality device;

one or more proximity sensors configured to detect an object;

a processor configured to:
receive data from the one or more proximity sensors; and
predict a potential collision between a user of the virtual reality device and the object detected by the one or more proximity sensors; and
an alarm configured to generate an alert regarding the potential collision.

In one example of a virtual reality device, the alarm is further configured to generate the alert only for potential collisions outside of a predefined distance surrounding the virtual reality device such that body parts of the user will not trigger the alert as the potential collision.

In one example of a virtual reality device, the processor is further configured to:
estimate a distance between a floor and the virtual reality device based on data regarding the orientation of the virtual reality device obtained from the gyroscope;
define an outer threshold based on combining the distance between the floor and the virtual reality device with data regarding physical dimensions of a user; and
prevent the alarm from generating an alert if the potential collision is out of range of the outer threshold.

In one example of a virtual reality device, the distance between the floor and the virtual reality device dynamically changes during operation of the virtual reality device and the outer threshold is dynamically changed with the distance between the floor and the virtual reality device.

In one example of a virtual reality device, the one or more proximity sensors are ultrasonic sensors configured to propagate a sound through air and to receive the sound after reflecting off the object.

In one example of a virtual reality device, the one or more proximity sensors are selected from the group of proximity sensors consisting of: light detection and ranging (LIDAR) sensors, radio detection and ranging (RADAR) sensors, radio wave sensors, infrared (IR) sensors, capacitive sensors, inductive sensors, and ultrasound sensors.

In one example of a virtual reality device, the alert is selected from the group of alters consisting of: an audible alert, a visual alert, a vibration, and haptic feedback.

In one example of a virtual reality device, the one or more proximity sensors are mounted to a headset wearable by the user.

In one example of a virtual reality device, the one or more proximity sensors are mounted to a handheld controller.

In one example of a virtual reality device, the virtual reality device further comprising a communication device to communicate with an external device regarding the potential collision.

In one example of a virtual reality device, the one or more proximity sensors are further configured to determine a velocity or acceleration of the object relative to the virtual reality device.

In one example of a virtual reality device, the virtual reality device is employed for mixed reality settings and the alarm generates the alert in the mixed reality setting.

In one example of a virtual reality device, a first proximity sensor is mounted to a component of the virtual reality device with a first angle of view and a second proximity sensor is mounted to the component of the virtual reality device with a second angle of view that encompasses a different field of view compared to the first angle of view.

In one example there is provided, a virtual reality system, including
an interface device comprising:
an accelerometer configured to sense an acceleration of the interface device;
a gyroscope configured to sense an angular velocity and orientation of the interface device;
a first proximity sensor configured to detect an object;
a first communication device to send data regarding the object from the first proximity sensor to a processor;
a headset device comprising:
a second proximity sensor configured to detect the object; and
a second communication device to send data regarding the object from the second proximity sensor to the processor;
the processor configured to predict a potential collision between a user of the interface device and the object detected by the first proximity sensor and the second proximity sensor; and
an alarm configured to generate an alert regarding the potential collision.

In one example of a virtual reality system, the alarm is further configured to generate the alert only for potential collisions outside of a predefined distance surrounding the interface device or the headset device such that body parts of the user will not trigger the alert as the potential collision.

In one example of a virtual reality system, the processor is further configured to:
estimate a distance between a floor and the virtual reality device based on data regarding the orientation of the virtual reality device obtained from the gyroscope;
define an outer threshold based on combining the distance between the floor and the virtual reality device with data regarding physical dimensions of a user; and
prevent the alarm from generating an alert if the potential collision is out of range of the outer threshold.

In one example of a virtual reality system, the distance between the floor and the virtual reality device dynamically changes during operation of the virtual reality device and the outer threshold is dynamically changed with the distance between the floor and the virtual reality device.

In one example of a virtual reality system, the first proximity sensor and the second proximity sensor are ultrasonic sensors configured to propagate a sound through air and to receive the sound after reflecting off the object.

In one example of a virtual reality system, the first proximity sensor and the second proximity sensor are selected from the group of proximity sensors consisting of: light detection and ranging (LIDAR) sensors, radio detection and ranging (RADAR) sensors, radio wave sensors, infrared (IR) sensors, capacitive sensors, inductive sensors, and ultrasound sensors.

In one example of a virtual reality system, the alert is selected from the group of alters consisting of: an audible alert, a visual alert, a vibration, and haptic feedback.

In one example of a virtual reality system, the interface device is selected from the group interface devices consisting of: a wearable device, a hand held controller, a glove, footwear, and a wrist device.

In one example of a virtual reality system, the first proximity sensor and the second proximity sensor are further configured to determine a velocity or acceleration of the object relative to the interface device and the headset device respectively.

In one example of a virtual reality system, the virtual reality device is employed for mixed reality settings and the alarm generates the alert in the mixed reality setting.

In one example of a virtual reality system, a first proximity sensor is mounted to the interface device or the headset device with a first angle of view and a second proximity sensor is mounted to the interface device or the headset device with a second angle of view that encompasses a different field of view compared to the first angle of view.

In one example there is provided, a method for avoiding collisions during a virtual reality experience, including
  detecting an object in proximity to a virtual reality device via one or more proximity sensors associated with the virtual reality device;
  determining a position and relative velocity of the object;
  predicting a potential collision between a user of the virtual reality device and the object; and
  generating an alarm regarding the potential collision.

In one example of a method for avoiding collisions during a virtual reality experience, the alarm is only generated for potential collisions outside of a predefined distance surrounding the virtual reality device such that body parts of the user will not trigger the alarm as the potential collision.

In one example the method for avoiding collisions during a virtual reality experience further comprises:
  estimating a distance between a floor and the virtual reality device based on data regarding the orientation of the virtual reality device obtained from a gyroscope associated with the virtual reality device;
  defining an outer threshold based on combining the distance between the floor and the virtual reality device with data regarding physical dimensions of a user; and
  preventing the alarm from generating an alert if the potential collision is out of range of the outer threshold.

In one example of a method for avoiding collisions during a virtual reality experience, the distance between the floor and the virtual reality device dynamically changes during operation of the virtual reality device and the outer threshold is dynamically changed with the distance between the floor and the virtual reality device.

In one example of a method for avoiding collisions during a virtual reality experience, the one or more proximity sensors are ultrasonic sensors and the detecting the object propagates a sound through air and receives the sound after reflecting off the object.

In one example of a method for avoiding collisions during a virtual reality experience, the one or more proximity sensors are selected from the group of proximity sensors consisting of: light detection and ranging (LIDAR) sensors, radio detection and ranging (RADAR) sensors, radio wave sensors, infrared (IR) sensors, capacitive sensors, inductive sensors, and ultrasound sensors.

In one example of a method for avoiding collisions during a virtual reality experience, the alarm triggers an alert selected from the group of alerts consisting of: an audible alert, a visual alert, a vibration, and haptic feedback.

In one example of a method for avoiding collisions during a virtual reality experience, the generating the alarm sends the alarm to an external device.

In one example the method for avoiding collisions during a virtual reality experience further comprises:
  determining a velocity or acceleration of the object relative to the virtual reality device.

In one example of a method for avoiding collisions during a virtual reality experience, the detecting the object is accomplished using a first proximity sensor with a first angle of view and a second proximity sensor with a second angle of view that encompasses a different field of view compared to the first angle of view.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology.

What is claimed is:

1. A virtual reality device, comprising:
  an accelerometer configured to sense an acceleration of the virtual reality device;
  a gyroscope configured to sense an angular velocity and orientation of the virtual reality device;
  one or more proximity sensors configured to detect an object;
  a processor configured to:
    receive data from the one or more proximity sensors; and
    predict a potential collision between a user of the virtual reality device and the object detected by the one or more proximity sensors; and
  an alarm configured to generate an alert regarding the potential collision;
  wherein the processor is further configured to:
    estimate a distance between a floor and the virtual reality device based on data regarding the orientation of the virtual reality device obtained from the gyroscope;
    define an outer threshold based on combining the distance between the floor and the virtual reality device with data regarding physical dimensions of a user; and
    prevent the alarm from generating an alert if the potential collision is out of range of the outer threshold.

2. The virtual reality device of claim 1, wherein body parts of the user and floor or ground will not trigger the alert as the potential collision.

3. The virtual reality device of claim 1, wherein the distance between the floor and the virtual reality device dynamically changes during operation of the virtual reality device and the outer threshold is dynamically changed with the distance between the floor and the virtual reality device.

4. The virtual reality device of claim 1, wherein the one or more proximity sensors are ultrasonic sensors configured to propagate a sound through air and to receive the sound after reflecting off the object.

5. The virtual reality device of claim 1, wherein the one or more proximity sensors are selected from the group of proximity sensors consisting of: light detection and ranging (LIDAR) sensors, radio detection and ranging (RADAR) sensors, radio wave sensors, infrared (IR) sensors, capacitive sensors, inductive sensors, and ultrasound sensors.

6. The virtual reality device of claim 1, wherein the alert is selected from the group of alerts consisting of: an audible alert, a visual alert, a vibration, and haptic feedback.

7. The virtual reality device of claim 1, wherein the one or more proximity sensors are mounted to a headset wearable by the user.

8. The virtual reality device of claim 1, wherein the one or more proximity sensors are mounted to a handheld controller.

9. The virtual reality device of claim 1, the virtual reality device further comprising a communication device to communicate with an external device regarding the potential collision.

10. The virtual reality device of claim 1, wherein the one or more proximity sensors are further configured to determine a velocity or acceleration of the object relative to the virtual reality device.

11. The virtual reality device of claim 1, wherein the virtual reality device is employed for mixed reality settings and the alarm generates the alert in the mixed reality setting.

12. The virtual reality device of claim 1, wherein a first proximity sensor is mounted to a component of the virtual reality device with a first angle of view and a second proximity sensor is mounted to the component of the virtual reality device with a second angle of view that encompasses a different field of view compared to the first angle of view.

13. A virtual reality system, comprising:
an interface device comprising:
an accelerometer configured to sense an acceleration of the interface device;
a gyroscope configured to sense an angular velocity and orientation of the interface device;
a first proximity sensor configured to detect an object;
a first communication device to send data regarding the object from the first proximity sensor to a processor;
a headset device comprising:
a second proximity sensor configured to detect the object; and
a second communication device to send data regarding the object from the second proximity sensor to the processor;
the processor configured to predict a potential collision between a user of the interface device and the object detected by the first proximity sensor and the second proximity sensor; and
an alarm configured to generate an alert regarding the potential collision;
wherein the processor is further configured to:
estimate a distance between a floor and the virtual reality device based on data regarding the orientation of the virtual reality device obtained from the gyroscope;
define an outer threshold based on combining the distance between the floor and the virtual reality device with data regarding physical dimensions of a user; and
prevent the alarm from generating an alert if the potential collision is out of range of the outer threshold.

14. The virtual reality system of claim 13, wherein body parts of the user will not trigger the alert as the potential collision.

15. The virtual reality system of claim 13, wherein the distance between the floor and the virtual reality device dynamically changes during operation of the virtual reality device and the outer threshold is dynamically changed with the distance between the floor and the virtual reality device.

16. The virtual reality system of claim 13, wherein the first proximity sensor and the second proximity sensor are ultrasonic sensors configured to propagate a sound through air and to receive the sound after reflecting off the object.

17. The virtual reality system of claim 13, wherein the first proximity sensor and the second proximity sensor are selected from the group of proximity sensors consisting of: light detection and ranging (LIDAR) sensors, radio detection and ranging (RADAR) sensors, radio wave sensors, infrared (IR) sensors, capacitive sensors, inductive sensors, and ultrasound sensors.

18. The virtual reality system of claim 13, wherein the alert is selected from the group of alters consisting of: an audible alert, a visual alert, a vibration, and haptic feedback.

19. The virtual reality system of claim 13, wherein the interface device is selected from the group interface devices consisting of: a wearable device, a hand held controller, a glove, footwear, and a wrist device.

20. The virtual reality system of claim 13, wherein the first proximity sensor and the second proximity sensor are further configured to determine a velocity or acceleration of the object relative to the interface device and the headset device respectively.

21. The virtual reality system of claim 13, wherein the virtual reality device is employed for mixed reality settings and the alarm generates the alert in the mixed reality setting.

22. The virtual reality system of claim 13, wherein a first proximity sensor is mounted to the interface device or the headset device with a first angle of view and a second proximity sensor is mounted to the interface device or the headset device with a second angle of view that encompasses a different field of view compared to the first angle of view.

23. A method for avoiding collisions during a virtual reality experience, comprising:
estimating a distance between a floor and a virtual reality device based on data regarding the orientation of the virtual reality device obtained from a gyroscope associated with the virtual reality device;
defining an outer threshold based on combining the distance between a floor and the virtual reality device with data regarding physical dimensions of a user;
detecting an object in proximity to a virtual reality device via one or more proximity sensors associated with the virtual reality device;
determining a position and relative velocity of the object;
predicting a potential collision between a user of the virtual reality device and the object;
generating an alarm regarding the potential collision; and
preventing the alarm from generating an alert if the potential collision is out of range of the outer threshold.

24. The method of claim 23, wherein body parts of the user, ground or floor will not trigger the alarm as the potential collision.

25. The method of claim 23, wherein the distance between the floor and the virtual reality device dynamically changes during operation of the virtual reality device and the outer threshold is dynamically changed with the distance between the floor and the virtual reality device.

* * * * *